June 7, 1960

E. C. LUNDEBERG 2,939,145

EYE SETTING MACHINE

Filed May 28, 1956

INVENTOR.
Edgar C. Lundeberg
BY
Attorneys

INVENTOR.
Edgar C. Lundeberg

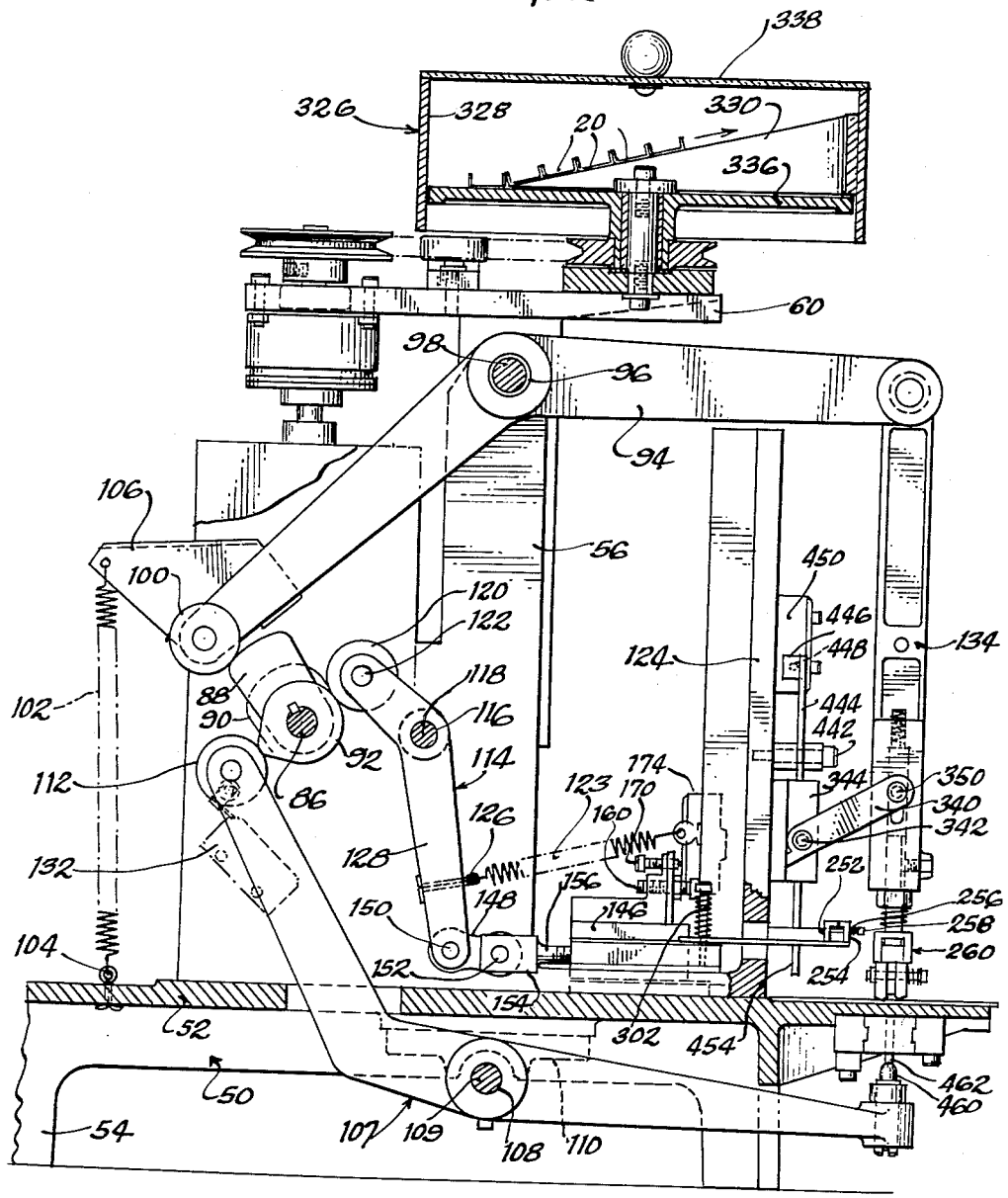

June 7, 1960 E. C. LUNDEBERG 2,939,145
EYE SETTING MACHINE
Filed May 28, 1956 9 Sheets-Sheet 5
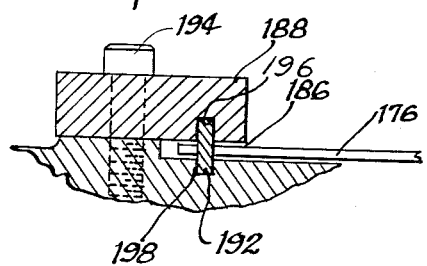
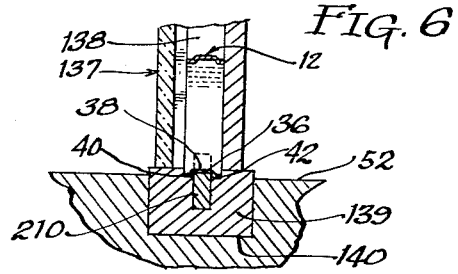
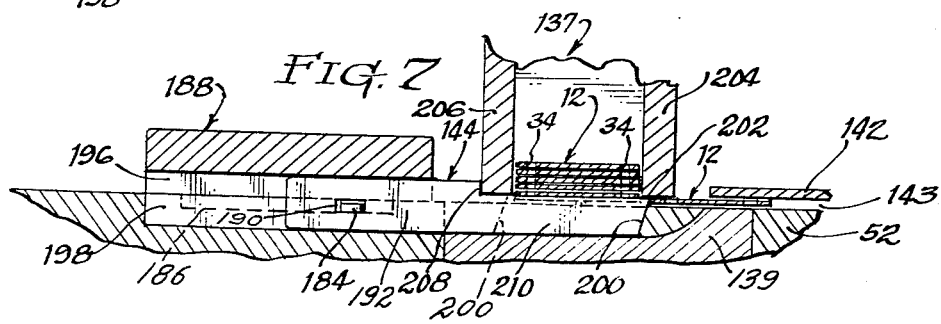
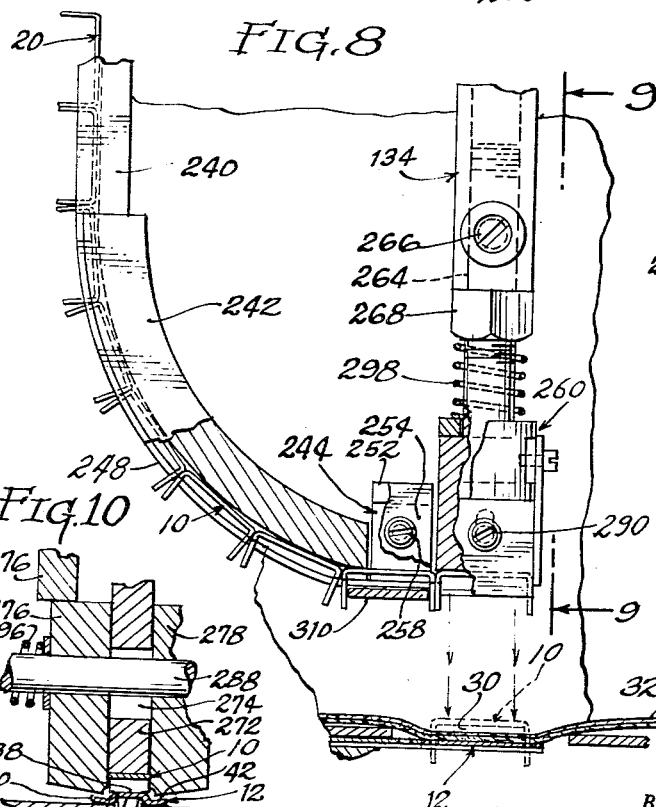
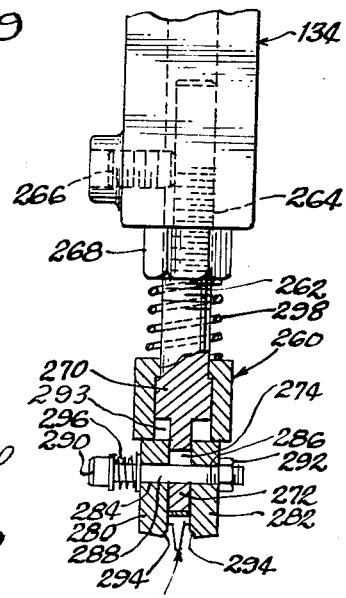
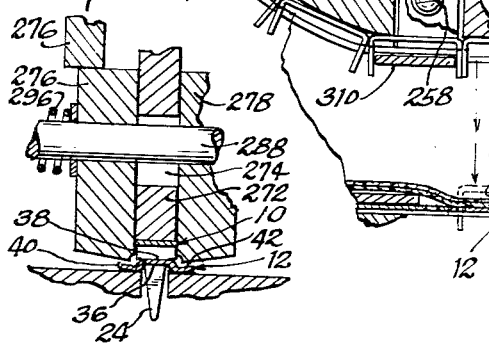
INVENTOR.
Edgar C. Lundeberg
BY Jones, McDougall,
Williams & Herth
Attorneys

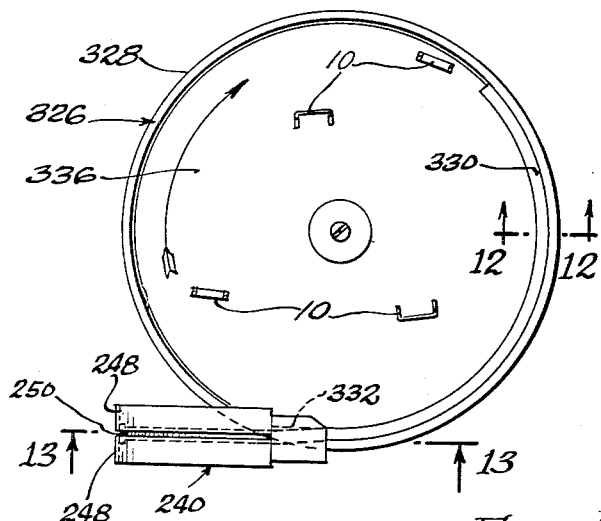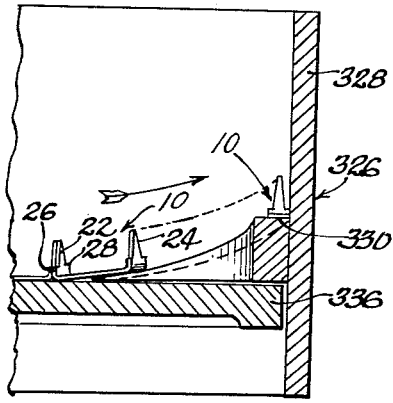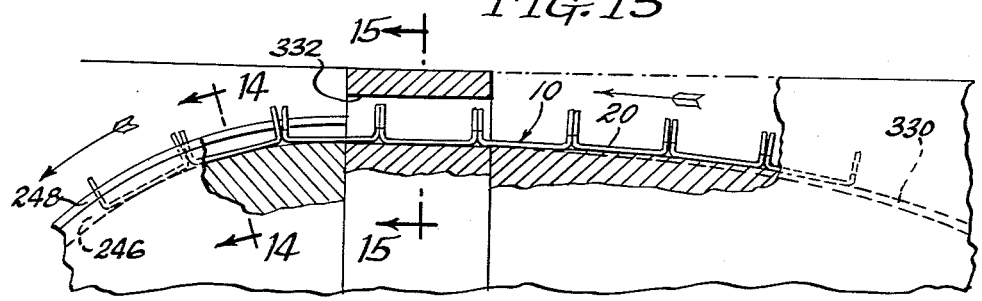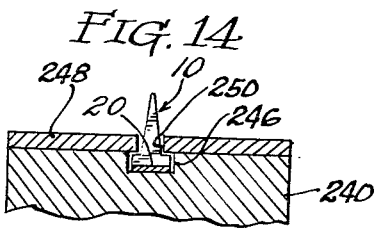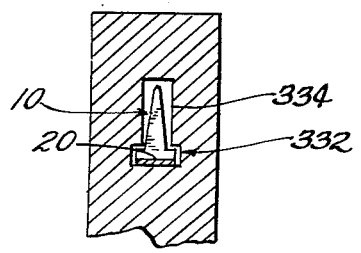

June 7, 1960  E. C. LUNDEBERG  2,939,145
EYE SETTING MACHINE
Filed May 28, 1956  9 Sheets-Sheet 7
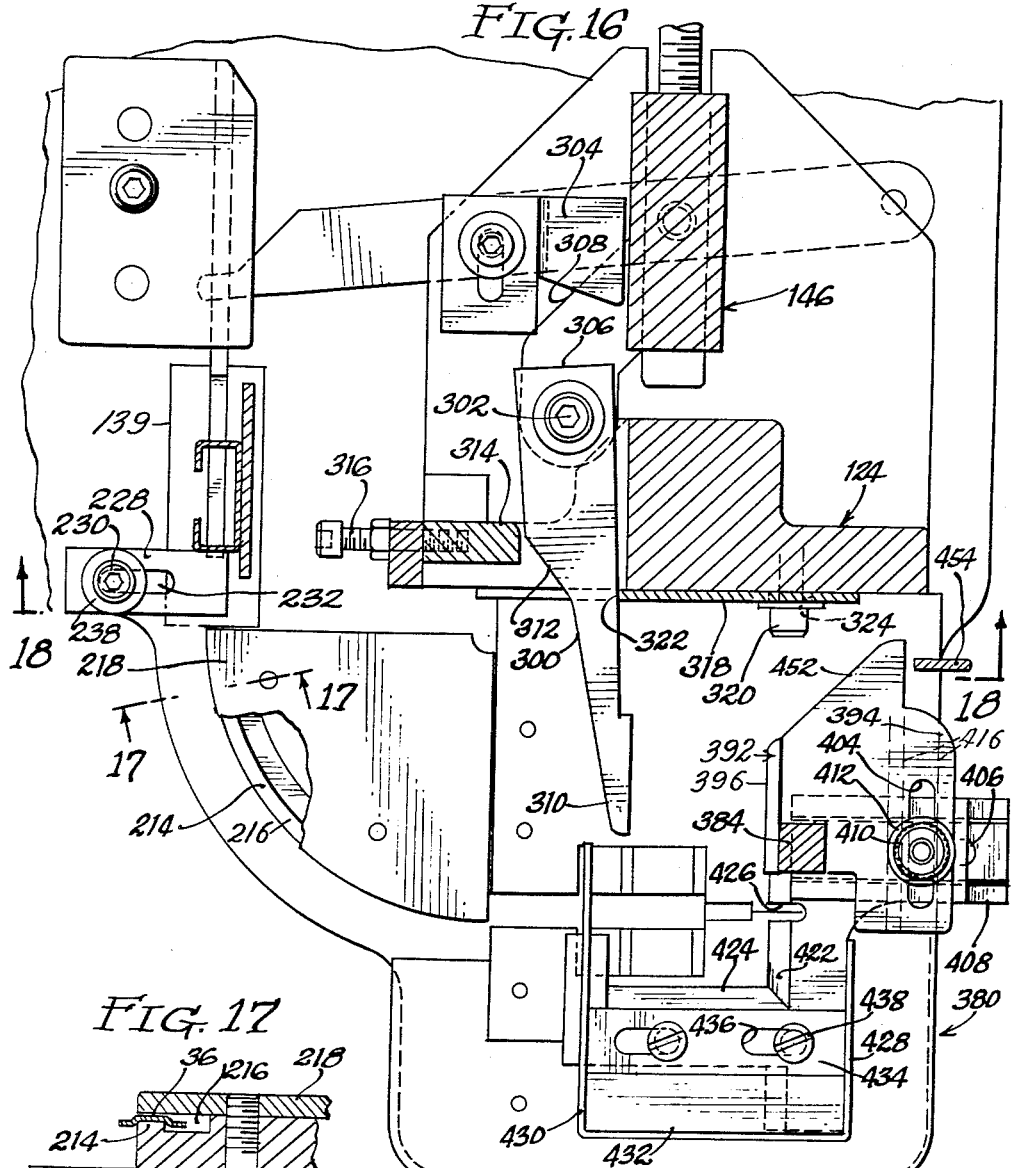
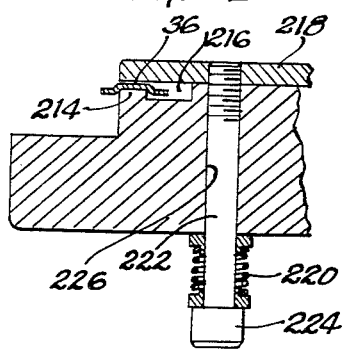
INVENTOR:
Edgar C. Lundeberg
BY
Doms, McDougall,
Williams & Hersh
Attorneys June 7, 1960
E. C. LUNDEBERG
2,939,145
EYE SETTING MACHINE
Filed May 28, 1956
9 Sheets-Sheet 8
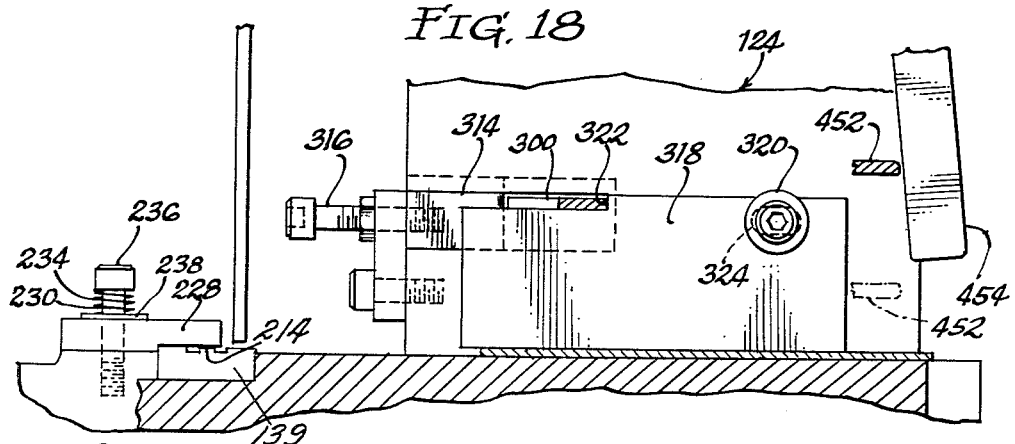
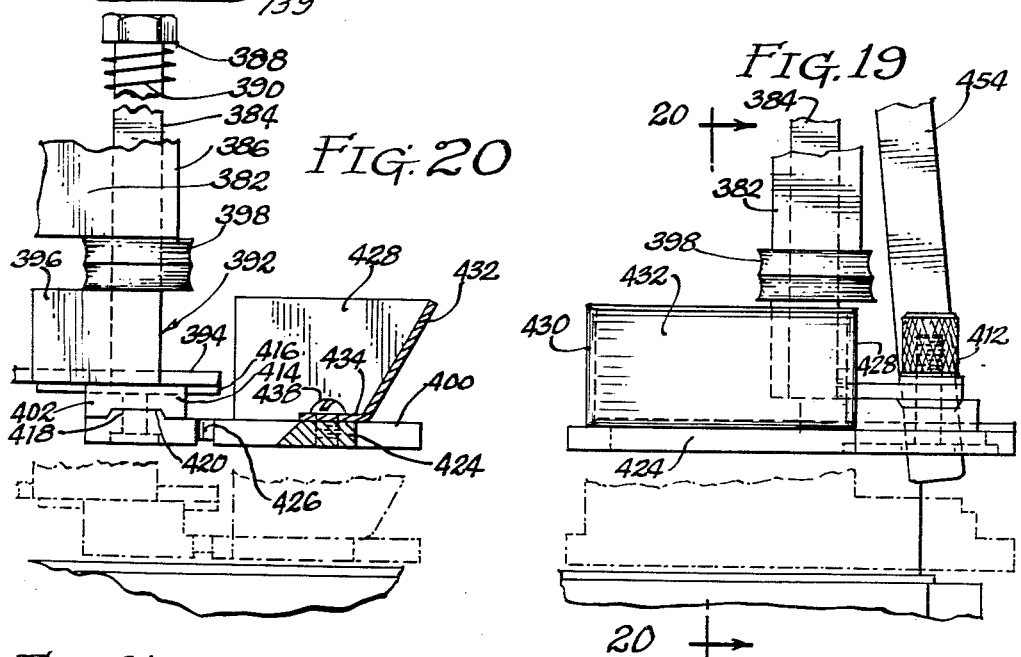
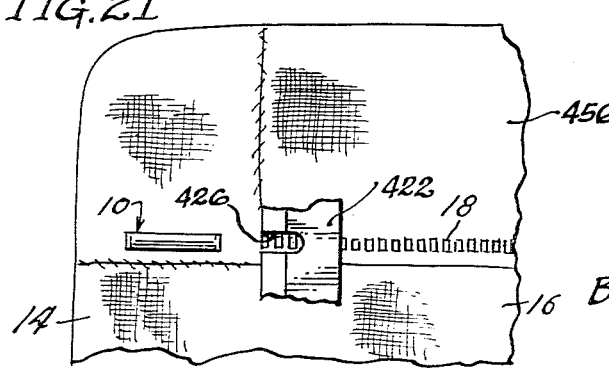
INVENTOR:
Edgar C. Lundeberg
By Ooms, McDougall,
Williams & Hersh
Attorneys

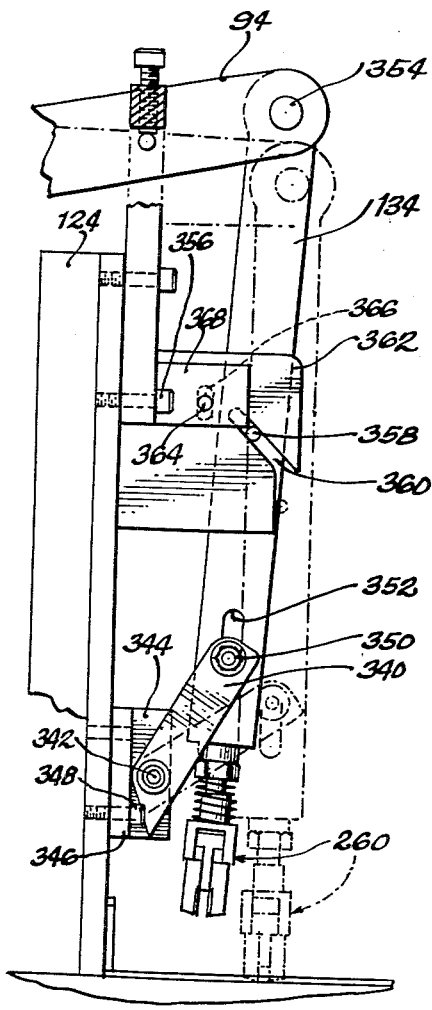

United States Patent Office 2,939,145
Patented June 7, 1960

2,939,145
EYE SETTING MACHINE

Edgar C. Lundeberg, West Hartford, Conn., assignor, by mesne assignments, to Industrial Development Corporation, Chicago, Ill., a corporation of Illinois Filed May 28, 1956, Ser. No. 587,784

28 Claims. (Cl. 1—3)

This invention relates to a machine for use in the assembly of eye and stay elements in position for use as a fastening means in garments and the like and it relates more particularly to a machine which operates substantially automatically separately to feed eye and stay members for attachment in position of use on a garment and it is an object of this invention to produce a machine of the type described.

More specifically, it is an object of this invention to produce an assembly machine for use in the attachment of eye and stay members in position of use on textile material; in which means are embodied to prevent operation of the machine until the latter is cleared of all obstructions and the elements are in proper position for attachment with the textile material therebetween; in which means are provided to guard against injury both to the operator and to the material during operation of the machine; in which means are provided for automatically feeding the eye and stay members into position for assembly of the eye and stay units in the desired location with the textile material or garment; in which means are provided properly to align the textile material or garment in position for receiving the eye-stay members for attachment; in which means are embodied in the machine for controlling the sequence of operations of the various functions of the machine and for adjusting the movements thereof for attachment of eye and stay members of different dimensions; in which means are embodied in the machine to prevent operation of the machine until the elements are in proper position for feeding the elements into position of use thereby to prevent injury to the machine and wherein means are provided for easy access to the parts of the machine for the release of elements out of alignment thereby to free the machine for further use in operation; in which means are provided for resilient engagement of the parts in position of use to prevent injury to parts thereof in the event that interferences or unforeseen obstructions are encountered, and in which means are provided for proper alignment of the elements for the location of parts in position for assembly and for proper alignment one with the other and with the garment or textile material for attachment of the eye-stay members thereto.

In general, it is an object of this invention to produce a machine which operates automatically to feed eye and stay members and to attach the eye and stay members in proper position of use on a garment and to effect such operations at high speed and in a safe and efficient manner thereby to increase the rate of attachment of the fastening means in proper position on the garment with marked savings in labor and with a material savings from the standpoint of waste or replacement of elements and from the standpoint of wear and tear on the garment.

These and other objects and advantages of this invention will hereinafter appear and for purposes of illustration, but not of limitation, an embodiment of the invention is shown in the accompanying drawings in which—

Figure 4 is a sectional view taken along the line 4—4 of Figure 1;

Figure 5 is a sectional view taken along the line 5—5 of Figure 3;

Figure 6 is a sectional view taken along the line 6—6 of Figure 3;

Figure 7 is a sectional view taken along the line 7—7 of Figure 3;

Figure 8 is a sectional elevational view of a portion of the machine shown in Figures 1 and 2 illustrating the feed section of the eye members;

Figure 9 is a sectional view taken along the line 9—9 of Figure 8;

Figure 10 is a sectional elevational view of the attachment means illustrated in Figures 8 and 9 with the parts displaced partially to operative position;

Figure 11 is a top plan view of the feed mechanism illustrated in Figures 1, 2 and 4 of the drawings;

Figure 12 is a sectional view taken along the line 12—12 of Figure 11;

Figure 13 is a sectional view taken along the line 13—13 of Figure 11;

Figure 14 is a sectional view taken along the line 14—14 of Figure 13;

Figure 15 is a sectional view taken along the line 15—15 of Figure 13;

Figure 16 is a sectional view taken through a portion of the machine at a level with the slide section and taken horizontally through the slide section;

Figure 17 is a sectional view taken along the line 17—17 of Figure 16;

Figure 18 is a sectional view taken along the line 18—18 of Figure 16;

Figure 19 is a fragmentary elevational view taken from the position 19—19 in Figure 16;

Figure 20 is a sectional view taken along the line 20—20 of Figure 19;

Figure 21 is a fragmentary view illustrating the alignment of the garment in position of use for eye attachment; and Figure 22 is a side elevational view showing a modification of the ram section.

Figure 1:
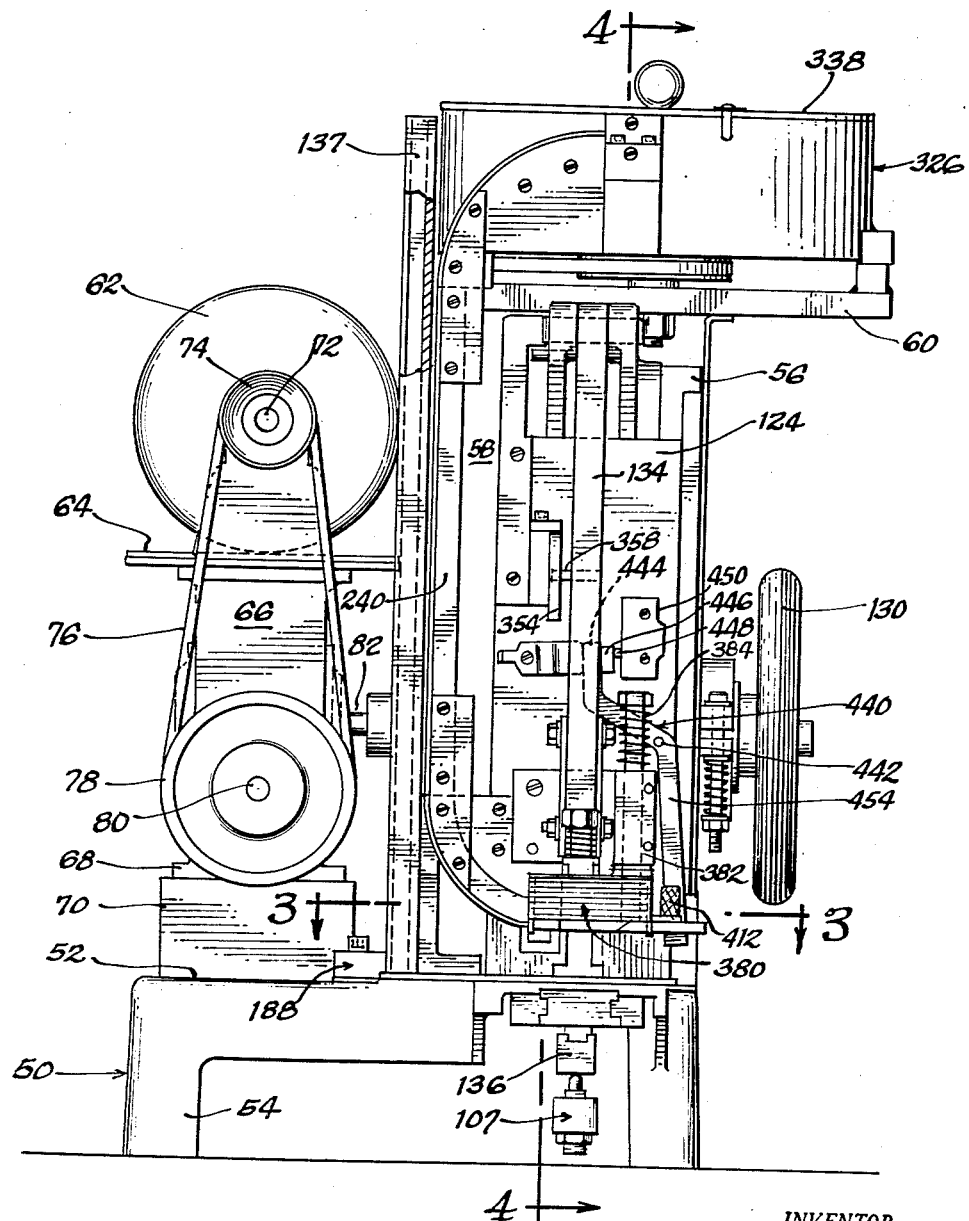
Figure 1 is a front elevational view of a machine embodying the features of this invention.
Figure 2:
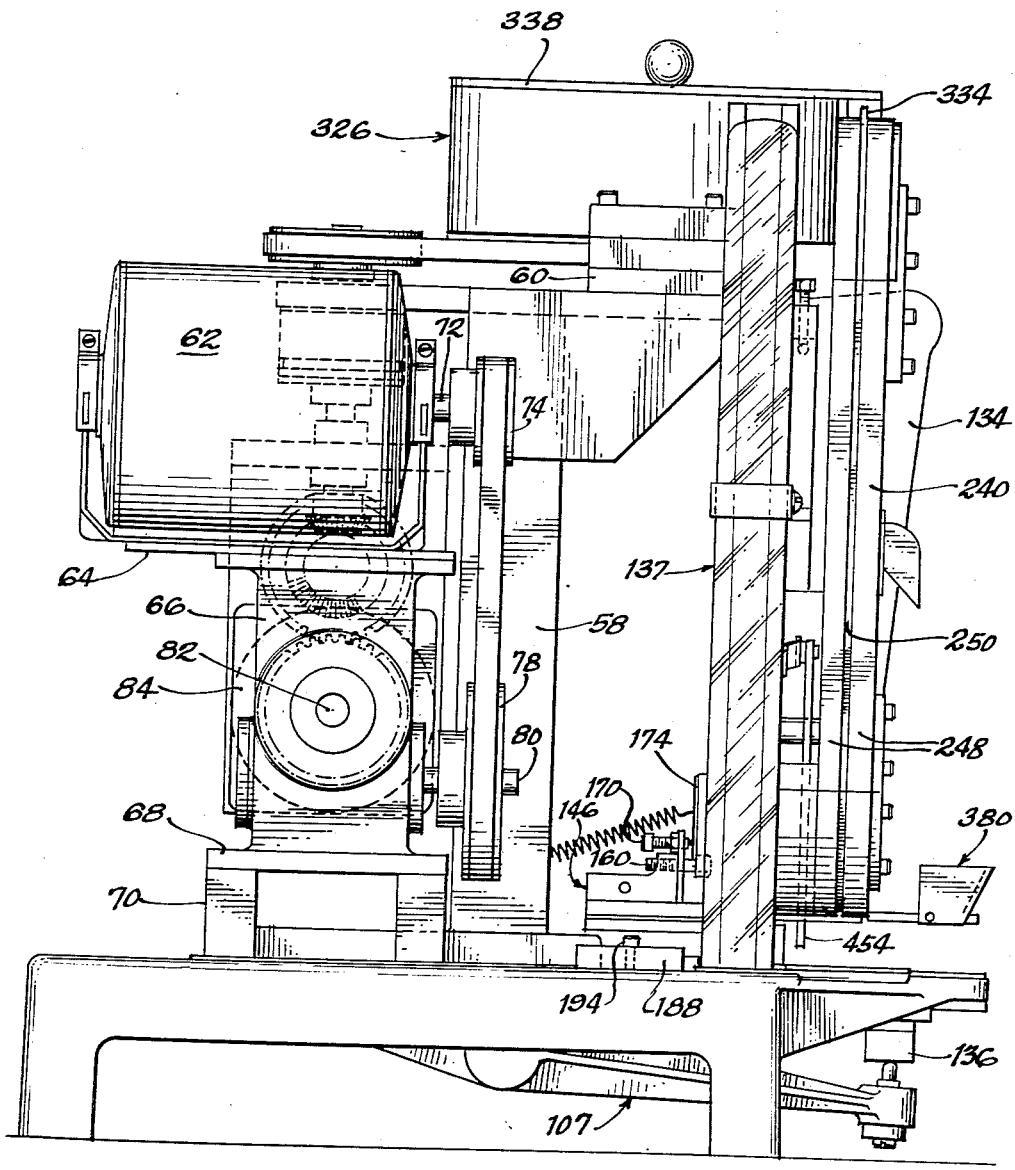
Figure 2 is a side elevational view of the machine shown in Figure 1.

A machine embodying the features of this invention has application for use with an eye member 10 and stay members 12 of the type described in the Markin Patent No. 2,593,162, issued April 15, 1952, for use in attachment to the waist band 14 of a trouser 16, preferably spaced upwardly from but in alignment with the zipper 18 or other fastening means for closing the fly of the trouser. It will be understood that the fastening means described may differ somewhat in construction from the standpoint of the elements employed such as in the number of prongs and in the spaced relation between the prongs extending downwardly from the body portion of the eye member and from the contour of the stay plate for use in combinations therewith. It will be further understood that the eye-stay assembly may be attached to other textile materials and garments for use as a fastening means without departure from the invention described and claimed herein relating to the assembly by a machine which will hereinafter be described in which the eye and stay elements which have been used to illustrate the constructtion and operation of the machine are illustrated in detail in Figures 8 and 12 of the drawings. The eye member is illustrated as being formed of a strip of sheet metal having an elongate relatively flat body portion 20 of greater length than width and in which the end portions are turned downwardly to extend substantially perpendicularly as prongs 22 and 24 which are tapered inwardly at the ends to points for use in piercing the garment and which are formed with an upper end portion 26 of greater width than the portions depending therefrom to provide shoulders 28 spaced a short distance downwardly from the body portion. The shoulder operates in combination with the stay plate to provide a proper spaced relation 30 between the body portion 20 of the eye and the textile material 32 for insertion of the prongs therethrough to provide for resilient engagement of the textile material between the shoulders 28 and the stay plate 12 when in the assembled relation. Such resilient engagement over an extended length of material operates to prevent tearing of the textile material in assembly and use.

The stay plate 12 (Figure 3) comprises an elongate strip of sheet metal having a length greater than the length of the body portion of the eye with openings 34 therethrough in spaced relation corresponding to the distance between the prongs of the eye member for insertion of the prongs therethrough to enable the through extending portions of the prongs to be bent inwardly substantially perpendicularly to lie alongside the bottom wall of the stay plate between the openings and within the recess 36, see Figure 10, formed by the offset 38 from the lateral edge portions 40 and 42 of the stay plate. The openings in the stay plate are dimensioned to have a length greater than that of the prongs but less than that of the shoulder so as to function as a stop which prevents passage of the shoulder portion of the prongs therethrough.

The setting machine, forming the subject matter of this invention, comprises a stationary frame 50 of rigid construction having a horizontally disposed base plate 52 with legs 54 extending downwardly from the corners thereof to support the base plate 52 in spaced relation at the desired level on a table or other surface. A pair of vertically disposed, laterally displaced frame plates 56 and 58 are fixed at their lower ends to the base plate while a horizontally disposed platform 60 is fixed, as by conventional metal attachment means, to the upper end of the frame plates 56 and 58.

Power operating means in the form of an electrical motor 62 is mounted on a platform 64 fixed to the upper wall of a reduction gear box 66 which in turn is mounted on a platform 68 supported in fixed spaced relation from the base by legs 70. The driving shaft 72 of the power means 62 is provided with a pulley 74 on the end thereof for operative connection by a belt 76 with a pulley or sheave 78 fixed onto the end of a shaft 80 journalled for rotational movement in the reduction gear box 66.

Conventional means are provided in the gear box for adjustment of the speed of the rotation of the driving shaft 82 responsive to actuation of the motor 62 for driving the elements of the machine, as will hereinafter be described.

Mounted on the shaft 82 is a magnetic clutch 84 of conventional design which is used to operate a shaft 86 journalled for rotational movement between the side frame plates 56 and 58. Fixed to the shaft 86 between the frame plates for rotational movement therewith are a series of cam members 88, 90 and 92, each of which is contoured for actuation of various lever arms in timed sequence to effect a desired operation of the machine during rotation of the shaft 86 through a complete revolution for one cycle of operation.

A bell crank 94, hereinafter referred to as the ram lever, is formed with an opening 96 intermediate its ends for enabling a horizontally disposed shaft 98, supported between the frame plates 56 and 58, to extend through the opening for support to enable the ram lever 94 to rock freely about the shaft as a pivot. A follower in the form of a roller 100 is rotatably mounted on a shaft journalled in the rearward end portion of the ram lever in alignment to engage the end wall of the cam member 88 for actuation of the ram lever in rocking movement in the clockwise direction to operated position and to enable return of the ram lever in the counter-clockwise direction to its normal position. The ram lever is urged in the direction towards normal position and to bring the follower into resilient engagement with the cam by means of a coil spring 102 secured at one end to a bracket 104 removably attached to the base plate 52 while the upper end of the spring is secured to an extension 106 which is fixed to the rearward end portion of the ram lever 94.

Another bell crank lever, hereinafter referred to as the anvil lever 107, has an opening 108 intermediate its ends for enabling a horizontally disposed shaft 109 journalled at its ends in laterally spaced brackets 110, depending from the underside of the base plate, to extend through the opening 108 for support of the anvil lever in a manner to permit rocking movement thereof about the shaft as a pivot. A follower, illustrated by the roller 112, is mounted for free rotational movement on the rearward end portion of the anvil lever 107 in alignment to engage the outer edge of the cam plate 92 fixed to the driving shaft 86. The anvil lever is constantly urged to rock in the direction to bring the follower into resilient engagement with the cam 92 in response to gravitational force by reason of the presence of an overbalance in weight to the right of the pivot. In the alternative, spring means may be employed resiliently to urge the anvil lever to rock in the clockwise direction about its pivot between operated or raised position and normal or lowered positions.

A third bell crank lever, hereinafter referred to as the feed lever 114, is also formed with an opening 116 intermediate its ends for receiving a horizontally disposed shaft 118 supported between the frame plates 56 and 58 to mount the feed lever for rocking movement about the shaft as a pivot. A follower, illustrated by the roller 120, is mounted on the shaft 122 in the rearward end portion of the feed lever in alignment to engage the outer edge of the cam 90 for actuation of the feed lever from normal to operated positions. The feed lever is urged to rock about its pivot in the counter-clockwise direction to bring the follower into resilient engagement with the cam, as by means of a spring 123 secured at its forward end to a vertically disposed front wall 124 of the frame while the rearward end portion is anchored onto a bracket 126 removably secured to the downwardly extending arm portion 128 of the feed lever 114.

The drive shaft 86 extends outwardly beyond the frame plate 56 for mounting a wheel 130 on the free end portion thereof in position to be readily accessible for manual turning movement to actuate the machine slowly in one direction or another in its cycle of operation. Mounted on the frame plate in position to be engaged by the cam 88 is a contact switch 132, which, when made responsive to engagement of the switch arm by the cam 88, operates to cause the magnetic clutch 84 to become disengaged for stopping the rotational movement of the drive shaft 86 upon completion of a cycle of operation while the driving motor 62 and the driving shaft 82 continue to operate.

To the present, description has been made of the main drive mechanism and the take-offs therefrom by cam actuation of the described levers for operation of the ram 134 and then the anvil 136 to effect assembly of the aligned eye and stay members with the textile fabric therebetween followed by the separate feed of the eye and stay plate members in position for attachment during the next cycle of operation. Description hereinafter will be made to the conversion of the various movements of the described operating levers for effecting the described operations in sequence for attachment of the eye and stay plates and for advancement of the subsequent units in position for use in the next cycle of operation.

Referring now to the feed of the stay plates 12, as illustrated in Figures 1, 3, 5, 6 and 7 of the drawings, the numeral 137 indicates an elongate housing adapted slidably to be received within a socket (not shown) for removably mounting the housing in a vertical position alongside the lateral edge portion of the front frame plate 124. The housing is provided with a rectangular opening extending lengthwise therethrough dimensioned to receive a plurality of stay plates in stacked relation one over the other with the offset portions 36 in the center extending upwardly, as illustrated in Figure 6 of the drawings. The opening through the housing is dimensioned to receive the stay plates in stacked relation in a manner to permit free sliding movements of the stay plates vertically in the housing to bring the lowermost stay plate in the stack in position of rest upon a block 139 which is sunk into a suitable recess 140 which is formed in the top surface of the base plate 52 of the machine. The housing is adapted to be loaded with cartridges of the stay plates numbering in the hundreds for displacement vertically therein to position the lowermost stay plate in the stack for displacement forwardly from the housing into a feed channel 143 formed between a horizontally disposed groove 141 provided between the base plate 52 and a cover plate 142 through which the displaced stay plates are guided to the anvil 136 in position to receive the prongs of the eye members for attachment with the textile material located therebetween.

Displacement of the lowermost stay plate in the stack from the housing 137 into the feed channel 143 is effected in response to rocking movement of the feed lever 114 in the counter-clockwise direction by the resilient force of the spring 123 and under the control of the operating cam 90. Movement of the feed lever is transmitted to an actuating arm 176 through a slide section 146 operatively connected to the feed lever 114 through a link 148. The link is pivoted at one end on a shaft 150 fixed to the free lower end portion of the feed lever while the other end of the link is pivoted on a shaft 152 which is fixed onto the rearward end portion of a bracket 154 having a threaded shank 156 in engagement with the slide section to effect displacement thereof rearwardly and back responsive to rocking movement of the feed lever in the clockwise and counter-clockwise directions respectively between displaced and normal positions respectively. By adjustment of the threaded shank connecting the slide section 146 to the bracket 154, the stroke of the slide section can be adjusted for use with elements of various dimensions and to effect proper movement of the actuating members for displacement of the stay plate and the eye elements into position of use.

Forward displacement of the feed slide 146 to normal position is determined by means of a stop bolt 160 having a head 164 threadably received within a threaded opening extending rearwardly from the front face of the slide block wherein the stroke of the slide block can be adjusted by turning movement of the setscrew therein to adjust the distance which the head 164 extends forwardly of the block in position to engage the rear wall of the front frame plate 124. The stop bolt is secured in the desired position of adjustment, as by means of a nut 166 which can be tightened on the bolt against the slide block 146. Also secured onto a laterally extending portion 168 of the slide section and having a portion extending forwardly from the front wall is a switch operating means in the form of a bolt 170 which is threadably received within a threaded opening of the extension 168 for turning movement to adjust the bolt endwise into a position to engage the switch arm 172 of a switch 174 mounted on the front frame plate to close the switch when the slide is in its returned or normal position, as determined upon engagement of the front frame plate 124 by the head 164 of the stop screw 160. The switch 174 represents a safety switch which operates to prevent further cycling of the machine until any obstruction blocking return of the slide to normal position is removed.

Mounted beneath the slide plate 146 for swinging movement in a horizontal plane is a horizontally disposed elongate actuating arm 176 pivoted at one end upon a post 178 extending upwardly from the base. The actuating arm 176 extends crosswise from the pivot between a pair of posts 180 and 182 depending from the underside of the slide plate in longitudinally spaced apart relation for displacement of the actuating arm for rocking movement about its pivot 178 responsive to movement of the slide section between the normal forward and retracted positions. The outer free end portion of the actuating arm 176 is cut away to provide a finger 184 which extends laterally through a slot 186 in the lower side wall of a guide block 188 and into an opening 190 of an elongate feed arm 192 for operative engagement with the arm to effect displacement thereof lengthwise responsive to swinging movement of the actuating arm 176.

The guide block 188, which is fixed to the top side of the base plate, as by means of bolt members 194, has an elongate slot 196 extending rearwardly from the forward edge through an intermediate portion thereof and contiguous with a corresponding slot 198 in the base plate whereby the feed arm 192 is received for guided sliding movement within said aligned slots for displacement between its rearward position and its forward, normal, or feed position. The feed arm is formed with the horizontally disposed slot 190 in the rearward end portion in which the finger 184 of the actuating arm 176 is received. The forward end portion of the feed arm is formed with an inwardly and downwardly inclined forward edge 200 and the upper edge 202 is aligned endwise with the lowermost of the stay plates 12 in the magazine 138 for displacement thereof forwardly from the magazine in feeding relation responsive to movement of the feed arm 192 from the normal to feed position. For this purpose, the front wall 204 and the rear wall 206 of the housing 138 are spaced from the base plate by an amount to enable displacement of the forward end portion 202 of the feed arm therethrough into engagement with the lowermost of the stay plates for displacement. A shoulder 208 formed between the forward end portion 210 of the feed arm and the remainder is spaced from the forward edge of the arm by an amount adapted to bring the shoulder 208 into engagement with the rear wall 206 of the magazine to prevent further forward displacement of the feed arm beyond feed position. In its rearward position, controlled by the stroke of the actuating arm, the forward end portion of the feed arm is adapted to be located immediately rearwardly of the stack of stay plates in the magazine, as indicated by the broken line in Figure 7, to enable the stack of stay plates to rest on the base plate and bring the lowermost of the plates into the path of the feed arm for displacement.

Figure 3:
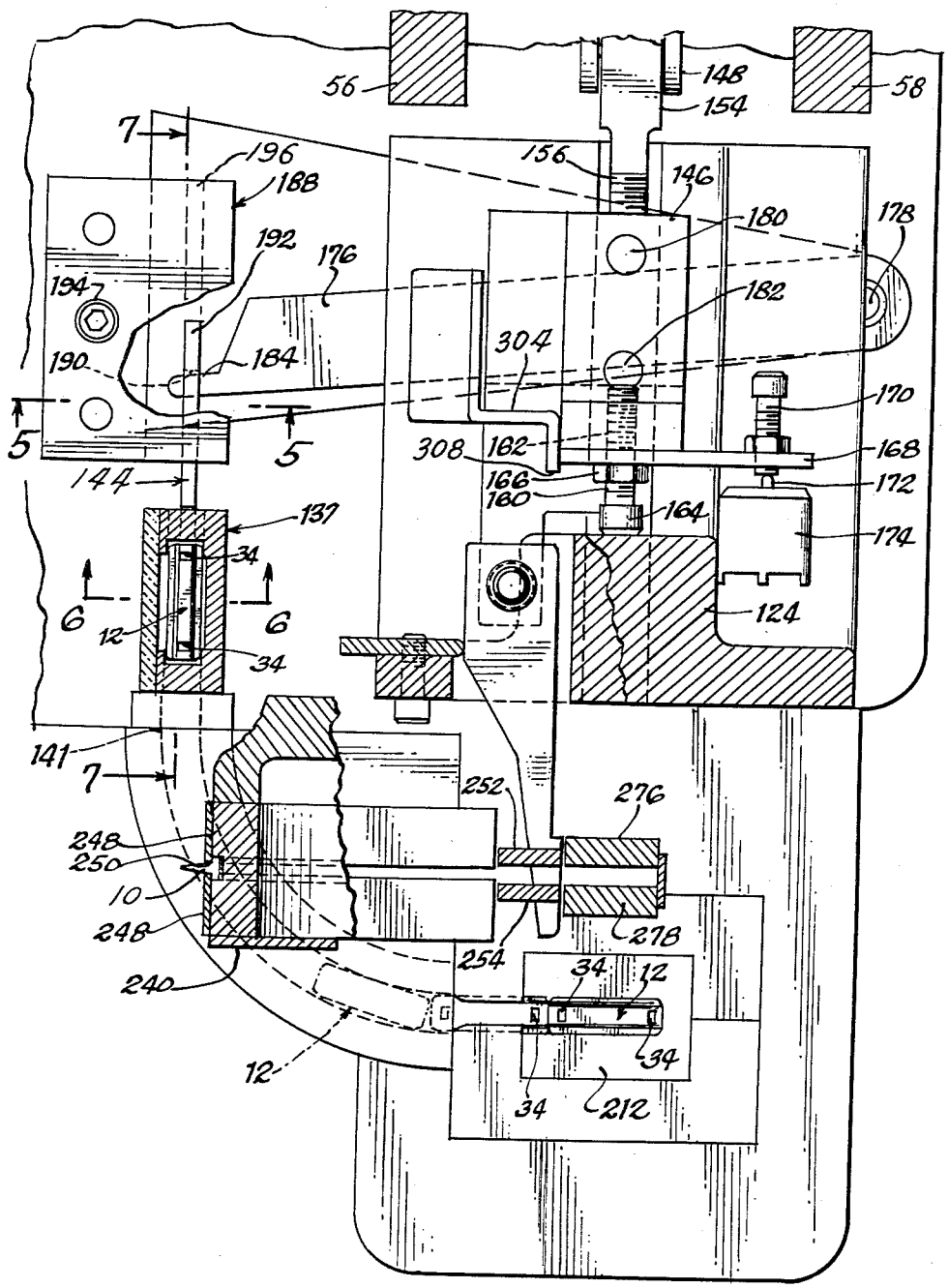
Figure 3 is a sectional view taken substantially along the line 3—3 of Figure 1.

As the actuating arm 192 is displaced forwardly from its rearward position, it engages the rear wall of the lowermost stay plate in the stack to cause forward displacement of the stay plate from the housing into the feed channel 143. When, as in normal operation, the feed channel is filled with stay plates aligned in end to end relation, as illustrated in Figure 3 of the drawings, displacement of the lowermost stay plate from the stack causes the aligned members in the feed channel concurrently to be displaced endwise to position the forward stay plate on the anvil 212 for attachment with the eye and the textile material therebetween, in a subsequent cycle of operation.

In the preferred modification, illustrated in Figures 16, 17 and 18, the feed channel comprises a rail 214 which is aligned with the intermediate inset portion 36 of the stay plates and is dimensioned to have a width corresponding thereto. The rail 214 which extends curvilinearly substantially continuously from the magazine to the anvil is formed with portions laterally thereof cut away to provide recesses 216 in which the downwardly offset end portions 42 of the stay plates may extend thereby to provide a guided relation during movement of the stap plates. The plates are held onto the rail by means of a top or cover plate 218 which is resiliently urged into position of use, as by means of coil springs 220 located about the shank of bolt members 222 between the head 224 of the bolt and the bottom side of the base plate. The bolt extends upwardly through an opening 226 in the base plate into threaded engagement with the cover plate 218.

In the preferred modification, the cover plate terminates short of the magazine to enable use of a separate slide plate 228 having one end portion which extends over the rail 214 in alignment with the magazine for guiding the stay plates onto the rail during displacement from the magazine. The slide plate extends laterally from the rail into engagement with a lateral portion of block 139 forming a corresponding part of the rail and it is secured in position of use by means of a bolt 230 which extends downwardly through an elongate slot 232 in the slide plate into threaded engagement with the base plate. The slide plate is urged downwardly into resilient engagement with the rail, as by means of a coil spring 234 which is positioned about the bolt 230 with one end of it bearing against the head 236 while the other end bears against a disc member 238 on the top side of the slide. This arrangement permits the slide plate to be easily and quickly adjusted laterally and to be tilted upwardly to provide ready access immediately beyond the area of the magazine for the relief of jams which might develop. This arrangement between the top plate 218 and the base plate also permits the top plate to be lifted sufficiently to remove any obstructions which might bar the normal passage of the stay plates from the magazine to the anvil.

The eye members 10 are advanced concurrently with the stay plates 12 in feeding relation to the ram 134 responsive to forward displacement of the slide section 146. As illustrated in Figures 1, 8, 13 and 14, the eye members are fed downwardly through a feed chute 240 which is vertically disposed substantially throughout its length with a lower end portion 242 turned inwardly to extend into substantially horizontal alignment with a holder 244 fixed to the front frame 124 of the device. The feed chute 240 is formed with an opening 246 extending lengthwise therethrough dimensioned to have a width corresponding to the width of the body portions of the eye members and a depth corresponding to the distance between the body portion and the shoulders 28 on the prongs 22 to enable the described portions of the eye members slidably to be received within lengthwise openings through the chute with the eye members aligned in end to end relation, as illustrated in Figures 8 and 13. The front wall 248 fixed to form a part of the chute is formed with a slot 250 aligned lengthwise with the center of the opening 246 and dimensioned to have a width corresponding to the width of the prong members 22 extending forwardly from the shoulder to enable the prongs to extend outwardly through the slot.

The holder 244 which is aligned endwise laterally with the lower end portion of the feed chute comprises a pair of plates 252 and 254 (Figure 4) having lower end portions spaced endwise one from the other by a distance corresponding to the width of the body portions of the eye members and preferably slightly less than the body portions thereby resiliently to engage the lateral edge portions of the eye members when displaced into position therebetween. The plates 252 and 254 of the holder 244 are constantly urged in a direction towards each other resiliently to engage the body portion of the eye member as by means of a coil spring 256 mounted on a pin 258 which extends endwise through the holder plates with a space in between, the coil spring being mounted about the pin with one end portion bearing against the head of the pin while the other end bears against the adjacent wall of the holder plate.

Aligned with the end of the holder, opposite the chute, is the ram head 260 which is supported on a hanger rod 262 for engagement in a threaded bore 264 extending upwardly from the end of the ram 134 for enabling vertical adjustment of the head relative the ram by turning movement of the head in one direction or another. Means are provided for securing the head in the desired position on the ram, as by means of a setscrew 266 and also by means of a lock nut 268 threadably engaging the threaded hanger rod 262 in position to be tightened against the underside of the ram, when in the assembled relation, to prevent relative turning movement.

The lower end portion of the hanger rod is formed with a slotted block 270 of rectangular cross section, dimensioned preferably to be larger than the diameter of the rod and depending from an intermediate portion of the underside of the block is a ram rod 272 in the form of a member which is rectangular in cross section and dimensioned to correspond with the length and width of the body portion of the eye unit and having a vertically disposed elongate slot 274 in the central portion thereof.

Supported by the block 270 is a circular member 260 having an upper end portion formed with an opening therein dimensioned slidably to receive the block 270 therein and dimensioned to have a length greater than that of the block to permit relative sliding movement of the block vertically therein between raised and lowered positions. The clamping plates 280 and 282 respectively are spaced one from the other by a distance corresponding to the width of the ram rod 272 adapted to be shiftable vertically therebetween with aligned openings 284 and 286 in the portions 280 and 282 respectively in the central portion of the plates in alignment with the slot 274 in the ram rod for insertion of a spindle 288 therethrough in a manner which enables the ram rod to shift endwise relative the plates between raised and lowered positions. The spindle 288 is formed with a head 290 on one end and a nut 292 on the other dimensioned to be greater than the openings 284 and 286 in the plate members. The lower end portions of the plates 280 and 282 are chamfered as at 294 at their inner end portions to provide for more effective engagement with the stay plates along the lateral edges immediately beyond the offsets positively to engage the stay plates for proper alignment with the eye members during the operation for attachment thereby to insure accurate alignment of the elements for assembly. The plates 280 and 282, which are normally spaced one from the other by an amount corresponding to the width of the body portion, and preferably slightly less, are urged in the direction towards each other by resilient means, such as the coil spring 296 which is mounted about the spindle 288 with one end portion of the coil springs bearing against the head 290 while the other end bears against the outer wall of the adjacent clamping plate 282 thereby constantly to urge the plates in the direction towards each other and resiliently to engage the lateral edges of any eye member when inserted therebetween. Thus the eye member is frictionally supported between the depending portions of plates 280 and 282 extending downwardly properly to align the eye members with the ram rod for forcing the prongs 22 through the openings of the stay plates, in assembly.

The clamp plate members on the ram head are urged in the direction towards their lowered position of adjustment to position the block and ram rods in the raised position therebetween by means of a coil spring 298 mounted about the hanger rod 262 and having one end bearing against the stop nut 268 while the other end bears against the top wall of the head 260 about the block. The ends of the clamping plates are urged to extend below the end of the ram rod 272 by an amount permitted by the spindle 288 in the slotted portion 274 of the ram rod or by an amount corresponding to the relative movement of the block 270 in the opening provided between the clamping plates 280 and 282, each of which are capable of independently functioning as stops to control movement of the ram rod relative to the clamping plates between normal and operated positions.

The length of the slot 274 or the length of the opening 293 in between the clamping plate portions 280 and 282 is predetermined to provide a stop for the ram sections in relative movement with the clamping members to locate the end of the ram rod above the level of the eye members upon insertion into the space between the clamping plates and to control movement of the ram rod from its normal to operated position wherein the end of the ram rod is spaced upwardly from the ends of the clamping plates by an amount predetermined to provide the spaced relationship desired between the body portion of the eye member and the stay plates, when in the assembled relation. By proper arrangement, it is possible to displace the ram rod relative the clamping plates by an amount to bear against the upper side of the body portions of the eye members while the chamfered ends of the clamp plates bear resiliently against the lateral edges of the stay plates resting on the anvil thereby to clamp the stay plates in proper alignment with the eye members in advance of displacement of the ram rod to force the eye member downwardly between the clamping plates to insert the prongs through the textile material and then through the aligned openings of the stay plates for a distance accurately controlled to provide the desired spaced relation between the eye members and the stay plates for bringing the shoulder into resilient engagement with the textile material therebetween while leaving a suitable slotted opening between the textile material and the body portion of the eye members for receiving a hook therethrough for fastening. In the normal position, the ram head is in alignment endwise with the feed chute holder 244 to provide a continuous slot for receiving the eye member displaced endwise from the one to the other.

The eye members are advanced from the holder into the ram head in response to positive displacement of the eye members from the end portion of the feed chute into the holder. Displacement in feeding relation is effected by means of a horizontally disposed elongate eye feed lever 300 which is pivoted at its rear end portion on a stud 302 extending upwardly from the slide unit 146 for rocking movement of the feed lever 300 about the stud in the horizontal direction between the outward and inward positions. The lever arm 300 is displaced to its outward position responsive to rearward movement with the slide 146 by means of a stop plate 304 fixed to the frame plate of the device in position to be engaged by the rear edge 306 of the feed lever 300 when displaced to its rearward position. The stop plate engaged by the lever is formed with a forward edge 308 which is slanted at a desirable angle to cause the feed lever 300 to be rocked about its pivot in the clockwise direction to its outward position upon engagement with the sloping edge portion of the stop plate when the feed lever is displaced to its rearward position.

When in the outwardly displaced position, the free end portion 310 of the lever arm 300 is aligned with the area between the prongs 22 of an eye member spaced from the end of the feed chute. When the slide 146 is displaced forwardly in feeding relation, the free end portion of the lever arm 300 is projected forwardly between the prongs. An intermediate portion of the feed lever is formed with a cam edge 312 in position to be engaged by an abutment 314 alongside the lever to cause the feed lever to rock in the counter-clockwise direction about its pivot thereby to swing the end portion 310 in the direction to engage the leading prong of the eye member to cause displacement thereof in the direction towards the holder. Thus the eye members are displaced endwise with the result that the eye member in the end of the chute is displaced into the holder 244 while the eye member within the holder is in turn displaced from the holder into the ram head 260.

The position of the abutment 314 may be adjusted by means of a setscrew 316 to increase or decrease the distance which the abutment extends in the path of the cam edge on the feed lever 300 thereby adjustably to control the amount and time of swinging movement thereby to insure proper insertion of the end portion of the feed lever between the prongs before the prongs are swung in feeding relation. The end portion of the abutment which is adapted to be engaged by the feed lever is preferably formed with a rounded or curvilinear edge for smooth operation. The inner position of the feed lever 300 in feeding relation is determined by a separate plate, in the form of a stop plate 318, secured to the front wall of the frame by means of a set screw 320 in position to locate an edge 322 of the plate in the path of the lever arm for engagement to stop rocking movement of the lever arm in its inner position. The plate 318 is formed with a horizontally disposed slot 324 through which the setscrew extends into engagement with the front frame plate for lateral adjustment of the stop plate.

The feed lever is adapted to be displaced rearwardly with the slide section 146 by an amount to clear the prongs of the eye members in the chute when in its rearward position and to be displaced into the area between the prongs when in its forward position thereby to provide a combination of endwise and swinging movements to effect the desired feeding relation of the eye members.

An important concept of this invention resides in the means for feeding the eye members in the desired arrangement in endwise alignment into the feed chute whereby the eye members therein subsequently travel by gravitational force downwardly through the chute. As illustrated in Figures 4, 11, 12, 13 and 15, the feed means comprises a cylindrical housing 326 having cylindrical side walls 328 with a shelf 330 extending inwardly from the side walls and rising gradually from a level with the bottom wall upwardly to a level slightly below the upper edge of the side wall, as illustrated in Figures 4 and 12. The shelf 330 has a width which is slightly greater than the width of the body portion 20 which terminates into a tunnel 332 in the form of a slot which extends through a block in the upper portion of the housing. The slot 334 (Figure 15) forming the tunnel is dimensioned to have a width at its base portion corresponding to the width of the body portion of the eye members and a height corresponding to the distance between the body portion and the shoulder on the prongs and a contiguous upwardly extending portion dimensioned to have a length and width corresponding to the remainder of the prongs thereby to function more or less as a gauge limiting passage therethrough to eye members of the desired dimension while in upright position with the prongs extending in the upwardly direction.

The bottom wall 336 of the housing is adapted to be rotated rapidly in the direction as indicated by the arrows in Figure 11 of the drawings by operative connection with the driving motor. As the table on the bottom wall of the housing is rotated rapidly within the housing, the eye members on the surface thereof are thrown centrifugally outwardly while at the same time being rotated rapidly with the table with the result that the eye members are caused to climb onto the platform 330. Those eye members which climb onto the platform with the body portion at rest on the platform are able to remain thereon and as additional eye units climb onto the platform, the ones in advance thereof are displaced upwardly simultaneously to achieve endwise movement whereby the uppermost eye member on the platform is projected through the gauge tunnel 332. The eye members displaced from the other end of the gauge tunnel enter the openings at the upper end of the feed chute in alignment therewith to load the chute.

The table 336 can be rotated continuously during operation of the driving motor 62 but a sufficient amount of eye members are fed into the feed chute for continuous operation of the machine when the feed table is operated intermittently, as over the period of time that the cam members are operated through a cycle of operation to effect the attachment of an eye and stay member to the garment or textile material. In operation, the housing can be loaded with a quantity of eye members sufficient for sustained operation over a long period of time. The open end of the housing can be closed, as by a removable cover 338.

The ram 134 which depends from the forward end portion of the rocker arm 94 is operatively connected at its lower end portion to the forward wall of the frame plate by means of a connecting lever 340 which is pivotally connected at its inner end on a stud 342 fixed to a bracket 344. The bracket is in turn provided with a horizontal portion 346 which is fixed by bolts 348 to the front wall of the frame. The other end of the connecting lever 340 is provided with a pin 350 between bifurcated sections which extends slidably through a vertically disposed slot 352 in the lower end portion of the ram 134 to permit the stud 350 to be displaced vertically in the ram responsive to rocking movement of the ram about its pivot 354 by which it is connected at its upper end to the forward end portion of the lever 94.

The connecting lever 340 operates to rock the ram inwardly about its pivot responsive to movement of the ram to its raised position and to rock the ram outwardly about its pivot to operative position during downward movement of the ram. The lever alone operatively interconnecting the ram with the housing is usually sufficient to effect the desired displacement of the ram between the receiving position and the eye member attaching position but positive contact is established by the use of a guide plate, which will hereinafter be described.

The additional guiding relation comprises a stud 358 which extends laterally from the ram into operative engagement with a slot 360 extending inwardly and upwardly from the forward edge of a vertically disposed metal plate 362 extending forwardly from the front wall of the frame. The plate 362 is adapted to be adjusted vertically relative the front frame member properly to position the slot with respect to the stud for positive displacement of the ram between the position in alignment with the holder and the position in vertical alignment with the anvil for downward displacement to effect the desired attaching operations. Vertical adjustment of the plate 362 is effected by means of a bolt or setscrew 364 which extends through a vertically disposed slot 366 in the plate 354 into threaded engagement with a bracket plate 368 fixed to the front wall of the frame. Sliding engagement between the pin 358 within the slot 360 operates to guide the ram in rocking movement responsible to vertical movement of the ram between raised and lowered positions thereby to effect controlled displacement of the ram inwardly into proper alignment with the holder 244 when the ram is in raised position and to rock the ram outwardly into proper alignment above the anvil when the ram is lowered to operative position.

The device is formed with a guide 380 for use in properly positioning the garment or other textile material on the anvil for receiving the eye member and anchor plate in the attached relation and for protecting the operator against inadvertent injury from the elements in motion during operation of the machine.

For this purpose, use is made of a new and novel structure including a bracket 382 in the form of a metal block which extends in upright position to the side of the ram 134 in the direction opposite the feed slots. The block 382 is fixed at its rearward edge to the front wall of the frame in vertically spaced relation with the base and it is provided at its forward end portion with a slot of rectangular or of other polygonal shape, other than round. An elongate shaft 384, dimensioned in cross-section to correspond with the slot, is slidably received in fitting relation therein in a manner to permit free vertical movement of the shaft between a raised and a lowered position.

The end of the groove in which the shaft is slidably received is concealed by a cover plate 386 secured, as by setscrews, to the front wall of the block to define a bore in which the shaft is slidable. A portion of the shaft extends upwardly beyond the block and is provided with a head 388 at its upper end for engagement by the upper end of a coil spring 390 mounted about the shaft. The lower end of the coil spring bears against the top wall of the block 382 thereby constantly to urge the shaft towards its raised position. It will be understood that other means conventional in the art may be employed resiliently to urge the shaft towards its raised position with sufficient force to return the shaft to this normal position when released.

A bracket 392 is secured to the lower end portion of the shaft 384 for vertical movement therewith. The bracket is formed with a horizontally disposed shelf 394 and a vertically disposed wall 396 which is along side the lower portion of the shaft and to which it is attached, as by means of setscrews. The wall 396 is in position to engage the under side of the block 382 when in raised position thereby to stop upward displacement of the shaft. For cushioning the impact between the bracket 392 and the block 382, during relative movement between raised and lowered positions, a cushioning means such as a rubber disc 398 is provided about the shaft immediately below the block 382.

A guide plate 400 is supported by the shelf 394 in a manner which permits both forward or rearward and crosswise adjustment properly to position the guide plate for use. For this purpose, use is made of an intermediate slide plate 402 having an opening in alignment with an elongate slot 404 in the shelf which extends in the forward and rearward direction. The opening in the slide plate is also aligned with a slot 406 which extends in the crosswise direction in a portion 408 of the guide plate. The elements are held onto the bottom side of the shelf by means of a bolt 410 and nut arrangement wherein the bolt extends downwardly through the shelf slot 404, the aligned opening of the slide plate 402, and the crosswise opening 406 of the guide plate into engagement with a nut mmeber on the under side of the guide plate. In the preferred modification, the nut member comprises an elongate element having a width slightly greater than the width of the crosswise slot 406 in the guide plate but less than a recess formed in the under side thereof to receive the nut member therein in sliding and in seating relation. The head 412 of the bolt is preferably formed with a knurled periphery to enable a gripping relation to be established, either by hand or by a tool, for turning the bolt in one direction or the other to loosen or to tighten the bolt onto the shelf. The head 412 is of sufficient dimension to engage the top wall of the shelf adjacent the slot openings when tightened down on the shelf to hold the parts together in their adjusted relation.

To prevent relative movement between the shelf and the slide plate other than in the linear, forward or crosswise directions, a groove 414 is formed in the top side of the slide plate and a corresponding tongue 416 is provided to depend from the bottom side of the shelf into fitting relation with the groove for guiding the interconnected elements in relative movement in the forward or rearward direction.

Similarly, an elongate tongue 418 is provided in the top side to extend crosswise in the slide plate and a groove 420 extending in the corresponding direction is formed in the bottom side of the slide plate to limit relative movement between the guide plate and the slide plate to the crosswise directions.

The slide plate is formed with a forwardly extending rule 422 and a rule 424 extending laterally from the forward end portion thereof. These elements operate between themselves to provide a square about the anvil which can be used properly to align the textile material in position for use. The inner edge portion of the forwardly extending rule 422 is formed with a recess 426 aligned crosswise with the center of the anvil so as to enable exact location of the crosswise line from the anchor plate in determining the position of attachment. The inner edges of the rules are tapered downwardly to a rather blunt edge and the under side of the rules are formed relatively flat for full engagement with the textile material when the guide plate is displaced downwardly onto the textile material in its lowered position.

To protect the operator and to prevent the operator's fingers from being introduced into the path of the ram during operation of the machine, a guard is provided in the form of laterally spaced-apart upright walls 428 and 430 which are contiguous and extend rearwardly from the lateral edges of an upwardly inclined front wall 432. The guard members are secured to the guide plate by means of a crossbrace member 434 having a pair of crosswise slots 436 therein through which setscrews 438 extend to secure the crosswise brace member onto the crosswise extending rule 424 of the guide section.

The machine is set into operation by means of an operating lever 440 which is pivoted intermediate its ends on a pin 442 extending forwardly from an upper portion of the front frame. The upper end 444 of the operating lever is provided with a block 446 in position to engage a button 448 on a switch 450 when the lever arm is rocked in the clockwise direction about its pivot. To prevent rocking movement of the lever arm in the direction to close the switch 450 until the guard and guide plate is in its lower position of adjustment, the shelf 394 is provided with a portion 452 which extends rearwardly into the path of the lower end portion 454 of the operating lever. Thus the lever arm cannot be rocked by an amount to close the switch until the shelf is lowered to the extent that the lower end portion of the lever arm is able to clear the shelf.

The switch 450 may be of the switch-operating type for immediate return of the button 448 and the operating lever arm 440 to normal position.

Briefly described, while at rest, and prior to operation of the machine, the slide section 146 of the feed mechanism is in its normal forward position with the feed arm 310 for the eye members being in its forward position between the prongs of the eye member at the end of the feed chute. The arm 210 is in its forward position with the end portion extending forwardly through the bottom of the magazine 138 in which the anchor plates are stacked. The ram 134 is in its rearward position with the ram head raised and in crosswise alignment with the holder 244 which in turn is in alignment with the feed chute 242 for the eye members.

An eye member is held between the clamping plates 280 and 282 of the ram head with the prongs extending downwardly. An anchor plate 12 is positioned in the slot extending crosswise in the anvil 212 in which the rocker arms, pivotally mounted for reciprocal movement in the slot to bend the prongs inwardly, are in their lowered position.

The guide plate 380 is in its upper or raised position with the extension 452 in the path of the starting lever 440 to block displacement thereof sufficiently to close the switch 450.

The portion of the fly 456 of a man's trouser is positioned on the base plate over the anvil with the upper edge portion of the zipper 18 showing through the guide slot 426 in the forwardly extending rule 422. The seams of the trouser can be aligned with the forward extending rule 422 and the crosswise extending rule 424 to make certain that the anchor plate will properly be aligned with the zipper or will otherwise properly be located on the trouser. When properly positioned on the base plate, the pants portion is held, as by the left hand, while the right hand can be used to bring the guide plate 380 downwardly onto the top side of the trouser and the base plate to clamp the trouser portion in position of use between the bottom side of the guide plate and the top side of the base plate about the anvil.

As the guide plate is brought down to its lowered position, the extension 452 passes beyond the lower edge of the operating lever 440 so as to enable the lever to be rocked about its pivot to make the switch 450.

In the meantime, the driving motor has been continuously running. When the starter switch 450 is closed, the magnetic brake clutch 84 is released to enable the shaft 86 to be operated by the driving shaft 80 from the motor. In sequence, the following operations take place.

The follower 100 on the end of the ram lever 94 rides up on the edge of the cam 88. This causes the ram lever to rock in the clockwise direction about its pivot. As the ram lever 94 is rocked about its pivot, the ram 134, pivoted to the forward end of the lever, is displaced in the downward direction. As the ram 134 is displaced downwardly, the pin 358 operated in the guide slot 360 and the link 340 function in combination to cause the ram to be rocked in the counterclockwise direction about its pivot until the ram head is displaced forwardly from a position in alignment with the holder to a position almost immediately above the anvil 212.

As the follower continues to ride outwardly on the cam 88, the ram 134 is displaced further downwardly to bring the ram head into engagement with the underlying textile material draped over the top side of the anvil. The chamfered edges 294 of the clamping members 280 and 282 fit into the recessed lateral edges of the anchor plate adjacent the body portion to align the anchor plate with the ram head for maintaining a desired spaced relation therebetween for proper insertion of the prongs through the textile material and the openings of the anchor plate in alignment therewith. The chamfered ends of the clamping plates engage the textile material and the anchor plates resiliently initially by an amount of force applied by the coil spring which is mounted on the hanger rod 262 of the ram assembly.

As the ram is further displaced in the downward direction, further movement of the clamping plates is arrested by the anvil with the result that the block 270 and the ram rod 272 are positively displaced downwardly between the clamping plates to effect displacement of the eye member downwardly between the clamping plates as guides, to project the prongs downwardly through the textile material and then through the openings in the anchor plates for a distance limited by the lengths of the slots 274 and 292. In practice, the amount of displacement of the eye member in the direction towards the anchor plate is calculated accurately to locate the body portion of the eye member in spaced relation from the anchor plates by an amount to provide an elongate slot of relatively uniform dimension between the body portion of the eye member and the textile material for receiving a hook member therebetween. For this purpose, the distance as between the body portion of the eye member and the anchor plate is controlled to bring the shoulders on the prongs of the eye members sufficiently close to the anchor plates adjacent the openings to effect a gripping relation of the textile material therebetween, as defined in the issued patent of Markin No. 2,593,162, issued April 15, 1952.

The extent of downward movement of the ram is achieved as the follower turns from the side wall onto the flattened end portion of the cam member thereby to hold the ram in its operative position for a time sufficient to effect the desired bending operations to turn the portions of the prongs extending through the openings in the anchor plate through an angle of about 90° to position the prongs to extend in a lateral direction adjacent the under side of the anchor plates.

As the follower 100 travels over the flattened end portion of the cam 88, cam 92 is rotated to the position where the follower 112 on the anvil lever 107 comes into engagement with the hump provided thereon. This causes the follower to be displaced briefly outwardly thereby to rock the anvil lever 107 in the counterclockwise direction about its pivot. This raises the forward end portion 460 of the anvil lever to engage an operating member 462 connected to rocker arms pivotally mounted in the vertically slotted portion of the anvil for bending the prongs of the eye members which extend downwardly through the anchor plates, as described in the co-pending application of Brayton, Serial No. 343,276, filed March 19, 1953, and entitled "Staple Type Eye Unit for Hook and Eye Fasteners and Method and Apparatus for Setting Them."

In effect, the rocker arms comprise a pair of levers pivoted to the anvil housing within the slot for rocking movement together in opposite directions and in the direction towards each other about their pivots. The upper edge portions of the rocker arms are contoured progressively to engage the prongs extending downwardly through the slots of the anchor plates into the paths thereof to bend the prongs inwardly substantially perpendicularly and thereby to lay the prongs smoothly and flatly within the channel provided therefor on the under side of the anchor plates.

During the bending operation, the eye member is held by the ram head in the desired relationship to the anchor plates so that the attachment and interconnection can be effected under fully controlled conditions as to the aforementioned proper alignment and spacing one from the other.

By the time that the rocker arms have completed their bending action, the follower 112 has passed over the hump in the cam 92 and almost coincidental therewith the follower 100 turns from the flattened outer end portion of the cam onto the side edges so that the anvil lever and the cam lever are free for return movement. The anvil lever is returned in response to the return of the rocker arms and in response to gravitational force while spring 102 becomes effective to cause the follower 100 resiliently to ride on the edge of the cam 88 thereby to control the ram in its return movement.

As the ram 134 rises, the spring about the hanger rod 262 is effective resiliently to hold the clamping plates down against the anvil and block until the block 270 and the ram rod 272 shift toward their outward position of adjustment. Thereafter, the ram head is raised with the ram. As the pin 358 enters the guide slot 360 and as the link 340 becomes effective, the ram rises and is simultaneously rocked inwardly about its pivot until it is stopped in endwise alignment with the holder in starting position.

During return movement of the anvil lever 107 and the cam lever 94 or immediately prior thereto, the roller 120 of the feed lever 114 begins to ride outwardly on the edges of the cam 90 in a manner to cause the feed lever 114 to rock in the clockwise direction about its pivot. Such rocking movement causes the lower end portion 128 of the feed lever to be displaced rearwardly with the result that the slide section 146 connected by the link 148 to the feed lever is displaced rearwardly therewith.

As the slide section is displaced from its forward to its rearward position of adjustment, the end 306 of the arm 300 engages the angular end 308 of the block 304 with the result that it is swung in the clockwise direction about its pivot 302 after the forward end portion 310 of the arm 300 has cleared the prongs depending downwardly from the eye members in the feed chute. This displaces the forward end portion of the arm 310 laterally to be aligned with the area between the prongs depending from the next to the last eye member in the feed chute.

Simultaneously, the studs 180 and 182 depending from the under side of the slide section effect rocking movement of the actuating arm 176 about its pivot 178 to its rearward position. The interconnection between the finger 184 on the actuating arm 176 and the feed arm 144 effects displacement of the forward end portion thereof to a position beyond the stack of anchor plates in the magazine, as indicated by the broken line in Fig. 7 of the drawing.

As the follower 120 rides downwardly on the trailing portion of the cam 90, the lever arm is free to rock about its pivot in the counterclockwise direction. Rocking movement thereof is effected resiliently by the force available from the coil spring 123 thereby to cause the feed lever 114 to be rocked about its pivot in a direction to cause forward displacement of the end portion 128 and the slide section 146 connected thereto. In response to forward displacement of the slide section, the forward end portion 310 of the lever 300 is projected into the area between the prongs depending from the eye member second from the last in the feed chute. As the lever 300 is shifted to its forward direction, operative engagement between the block 314 and the tapered lateral edge of the lever 300 causes the lever to be rocked about its pivot in the counterclockwise direction by an amount to effect displacement of the eye member upon engagement between the portion 310 of the lever and the prong depending therefrom to shift the eye member from the position next to the last in the chute to the position which is last in the chute. Simultaneously, the eye member formerly occupying the position last from the chute is forced laterally into the slot of the holder aligned therewith and the eye member in the slot of the holder is in turn forced to shift laterally into the slot between the clamping plates 280 and 282 of the ram head thereby to position an eye member in the ram head for the subsequent cycle of operation.

Simultaneously, the actuating lever 176 is rocked in the forward direction about its pivot 178. Thus the feed arm 144 is displaced in the forward direction from its rearward position to its normal position until the shoulder 208 engages the wall 206 of the magazine or until the slide section is stopped upon engagement of the head 164 of the setscrew 160 with the rear wall of the front frame 124. As the feed arm 144 is displaced forwardly from the position shown by the broken lines in Fig. 7 to the position shown by the solid lines, the lowermost of the anchor plates in the stack lying in the path of the upper edge of the feed arm is displaced forwardly through the slot 202 into the feed channel 143. Forward displacement of the anchor plate into the feed channel causes a train reaction which causes simultaneous displacement of the anchor plates aligned in end-to-end relation in the feed channel so that the outermost of the anchor plates is displaced from the feed channel onto the anvil 212 in position to be interconnected with the eye member in a subsequent cycle of operation.

In the event that an obstruction is encountered which prevents return of the slide section to its normal forward position, the button 172 is incapable of making switch 174, with the result that the machine cannot be operated further through a cycle of operation until the obstruction has been cleared.

Simultaneously with the operation of the cam shaft, the feed table 336 is actuated to effect turning movement of the feed table 336 about its axis while the machine is traveling through a normal cycle of operation. Thus eye members are caused to ride up upon the shelf 330 to supply the feed chute with sufficient eye members to maintain substantially continuous operation in the manner described.

It will be understood that numerous changes may be made in the details of construction, arrangement and operation without departing from the spirit of the invention, especially as defined in the following claims.

I claim:

1. In a machine for the assembly of an eye member having a body portion with prongs extending outwardly substantially perpendicularly therefrom and a stay plate having openings through which the prongs of the eye member extend for attachment with a textile material between the stay plate and the eye member, a magazine for the supply of a plurality of stay plates, a separate magazine for the supply of a plurality of eye members, means for displacing one of said eye members in feeding relation from the magazine during each cycle of operation of the machine, means for displacing one of said stay plates in feeding relation from said separate magazine during each cycle of operation of the machine, means for conveying an eye member displaced from the magazine into a vertically aligned relation with a stay plate with the prongs of the eye member aligned with the openings in the stay plate and extending from the eye member towards the stay plate and including means for effecting relative movements between the aligned stay plate and the eye member in the direction towards each other for passage of the prongs through the aligned openings in the stay plate, bending means operative subsequent to insertion of the prongs of the eye member through the openings of the stay plate for bending the through-extending portions of the prongs, a power source, an operative connection between the power source and said stay plate and eye feed means, said eye-conveying means and said bending means for rendering said means effective in sequence during each cycle of operation of the machine, and blocking means shiftable between blocking and unblocking positions to permit free access to the area between the stay plate and the eye member when in unblocking position and to prevent access to the area when in blocking position.

2. A machine as claimed in claim 1 in which the blocking means comprises a frame having guide means at its lower end for anchoring the textile material about the stay plate when in lowered position to hold the textile material in position to receive the eye assembly.

3. A machine as claimed in claim 2 in which the blocking means has vertically disposed side and front walls to prevent access into the area beyond the walls when in lowered position.

4. A machine as claimed in claim 2 in which the frame plate forming a lower portion of the blocking means has an indication in the side wall aligned with the center of the stay plate when in position to receive the prongs of the eye members for use in properly aligning the textile material therewith.

5. In a machine for the assembly of an eye member having a body portion with prongs extending outwardly substantially perpendicularly therefrom and a stay plate having openings through which the prongs of the eye member extend for attachment with a textile material between the stay plate and the eye member, a magazine for the supply of a plurality of stay plates, a separate magazine for the supply of a plurality of eye members, means for displacing one of said eye members in feeding relation from the magazine during each cycle of operation of the machine, means for displacing one of said stay plates in feeding relation from said separate magazine during each cycle of operation of the machine, means for conveying an eye member displaced from the magazine into a vertically aligned relation with a stay plate with the prongs of the eye member aligned with the openings in the stay plate and extending from the eye member towards the stay plate and including means for effecting relative movements between the aligned stay plate and the eye member in the direction towards each other for passage of the prongs through the aligned openings in the stay plate, bending means operative subsequent to insertion of the prongs of the eye member through the openings of the stay plate for bending the through-extending portions of the prongs, a power source, an operative connection between the power source and said stay plate and eye feed means, said eye-conveying means and said bending means for rendering said means effective in sequence during each cycle of operation of the machine, blocking means shiftable between blocking and unblocking positions to permit free access to the area between the stay plate and the eye member when in unblocking position and to prevent access to the area when in blocking position, switch means, and means for rendering said operative connection effective for actuating the machine through a cycle of operation responsive to operation of the switch means.

6. In a machine for the assembly of an eye member having a body portion with prongs extending outwardly substantially perpendicularly therefrom and a stay plate having openings through which the prongs of the eye member extend for attachment with a textile material between the stay plate and the eye member, a magazine for the supply of a plurality of stay plates, a separate magazine for the supply of a plurality of eye members, means for displacing one of said eye members in feeding relation from the magazine during each cycle of operation of the machine, means for displacing one of said stay plates in feeding relation from said separate magazine during each cycle of operation of the machine, means for conveying an eye member displaced from the magazine into a vertically aligned relation with a stay plate with the prongs of the eye member aligned with the openings in the stay plate and extending from the eye member towards the stay plate and including means for effecting relative movements between the aligned stay plate and the eye member in the direction toward each other for passage of the prongs through the aligned openings in the stay plate, bending means operative subsequent to insertion of the prongs of the eye member through the openings of the stay plate for bending the through-extending portions of the prongs, a power source, an operative connection between the power source and said stay plate and eye feed means, said eye-conveying means and said bending means for rendering said means effective in sequence during each cycle of operation of the machine, blocking means shiftable between blocking and unblocking positions to permit free access to the area between the stay plate and the eye member when in unblocking position and to prevent access to the area when in blocking position, switch means for rendering said operative connection effective for actuating the machine through a cycle of operation, and means for preventing operation of said switch means while said blocking means is in other than in blocking position.

7. A machine as claimed in claim 6 in which the means for preventing operation of the switch when the blocking means is other than in lowered position comprises a lever vertically mounted for swinging movement in the direction toward and away from the switch, means on the blocking means lying in the path of the lever when other than in lowered position, thereby to prevent rocking movement of the lever into position to close the switch.

8. In a machine for the assembly of an eye member having a body portion with prongs extending outwardly therefrom with the base portion of the prongs being of substantially larger dimension than the remainder but no larger than the body portion thereby to provide a shoulder between the end of said base portion and the prongs and a stay plate having openings through which the prongs of the eye member extend for attachment with a textile material therebetween, a frame, a magazine for the supply of a plurality of eye members including a vertically disposed elongate housing attached to the frame having side walls spaced one from the other by a distance corresponding to the width of the body portions of the eye members and having a front and back wall spaced one from the other by an amount greater than the thickness of the body portions of the eye members plus the distance to the shoulder but less than the length of the prong members extending outwardly therefrom and with a slot extending continuously lengthwise through the central portion of the front wall dimensioned to have a width less than the body portion of the eye members but greater than the width of the outer end portions of the prongs for receiving the eye members in end-to-end relation within the housing for sliding movement therein with the outer portions of the prongs extending through the central slot in the front wall of the housing, a separate magazine for the supply of a plurality of eye members, means for displacing one of said eye members in feeding relation from the magazine during each cycle of operation of the machine, means for displacing one of said stay plates in feeding relation from said separate magazine during each cycle of operation of the machine, means for conveying an eye member displaced from the magazine into a vertically aligned relation with a stay plate with the prongs of the eye member aligned with the openings in the stay plate and extending from the eye member towards the stay plate and including means for effecting relative movements between the aligned stay plate and the eye member in the direction towards each other for passage of the prongs through the aligned openings in the stay plate, bending means operative subsequent to insertion of the prongs of the eye member through the openings of the stay plate for bending the through-extending portions of the prongs, a power source, and an operative connection between the power source and said stay plate and eye feed means, said eye-conveying means and said bending means for rendering said means effective in sequence during each cycle of operation of the machine.

9. In a machine for the assembly of an eye member having a body portion with prongs extending outwardly therefrom and a stay plate having openings through which the prongs of the eye member extend for attachment with a textile material therebetween, a frame, a magazine for the supply of a plurality of eye members comprising a vertically disposed elongate housing secured to the frame and having side walls spaced one from the other by a distance corresponding to the width of the body portion of the eye members and having a front wall and back wall spaced one from the other by an amount greater than the thickness of the body portion but less than the length of the prong members and with a slot extending continuously lengthwise through the central portion of the front wall dimensioned to have a width less than the width of the body portion of the eye members but greater than the outer end portion of the prongs for receiving the eye members in end-to-end relation within the housing with the prongs extending outwardly through the central slot in the front wall, a separate magazine for the supply of a plurality of stay plates comprising a vertically disposed housing secured to the frame having an opening extending continuously through the interior thereof dimensioned to have a width and length corresponding to the width and length of the stay plates for receiving the stay plates in stacked relation therein, said housing having walls in which one pair of opposite walls terminate short of the others by an amount greater than the thickness of one stay plate but less than the thickness of two for enabling the housing to limit displacement of the lowermost stay plate in the stack, means for displacing one of said eye members in feeding relation from the magazine during each cycle of operation of the machine, means for displacing one of said stay plates in feeding relation from said separate magazine during each cycle of operation of the machine, means for conveying an eye member displaced from the magazine into a vertically aligned relation with a stay plate with the prongs of the eye member aligned with the openings in the stay plate and extending in the direction thereto and including means for effecting relative movements between the aligned stay plate and the eye member in the direction towards each other for passage of the prongs through the aligned openings in the stay plate, bending means operative subsequent to insertion of the prongs of the eye member through the openings of the stay plate for bending the through-extending portions of the prongs, a power source, and an operative connection between the power source and said stay plate and eye feed means, said eye-conveying means and said bending means for rendering said means effective in sequence during each cycle of operation of the machine.

10. A machine as claimed in claim 9 in which the means for displacing one of said eye members in feeding relation from the magazine comprises an elongate lever, means mounting the lever for rocking movement between operative and operated positions, means operatively engaging said lever-mounting means for linear movement on the frame between forward and retracted positions, means operatively engaging said lever upon displacement to retracted position for actuation thereof to operative position, and means operatively engaging said lever during movement from retracted to forward position for rocking the lever from operative to operated position.

11. In a machine for the assembly of an eye member having a body portion with prongs extending outwardly therefrom and a stay plate having openings through which prongs of the eye member extend for attachment, a frame, a magazine for the supply of a plurality of eye members, a separate magazine for the supply of a plurality of stay plates, means for displacing one of said eye members in feeding relation from the magazine during each cycle of operation of the machine comprising an elongate lever, means mounting the lever for swinging movement between operative and operated positions, means operatively engaging said lever-mounting means for linear movement on the frame between forward and retracted positions, means responsive to movement of the lever to retracted position for swinging movement thereof to operative position, means responsive to movement of the lever from retracted to forward position for swinging the lever from operative to operated position, means for displacing one of said stay plates in feeding relation from said separate magazine during each cycle of operation of the machine, means for conveying an eye member displaced from the magazine into a vertically aligned relation with a stay plate with the prongs of the eye member aligned with the openings in the stay plate and extending from the eye member towards the stay plate and including means for effecting relative movements between the aligned stay plate and the eye member in the direction towards each other for passage of the prongs through the aligned openings in the stay plate, bending means operative subsequent to insertion of the prongs of the eye member through the openings of the stay plate for bending the through-extending portions of the prongs, a power source, and an operative connection between the power source and said stay plate and eye feed means, said eye-conveying means and said bending means for rendering said means effective in sequence during each cycle of operation of the machine.

12. A machine as claimed in claim 11 in which the means for rocking the lever from operated to operative position responsive to displacement to retracted position comprises a stationary abutment in the path to be engaged by the end of the lever upon displacement of the lever to retracted position and in which the end of the lever and the abutment engaged are formed angularly with respect to one another to effect rocking movement of the lever from operated to operative position as the engaging portions are brought into alignment.

13. A machine as claimed in claim 11 in which the means operatively engaging the lever during movement from retracted to forward position for displacement of the lever from operative to operated position comprises a cam on the lateral edge of the lever in the operative direction, an abutment lying in the path of the cam during displacement of the lever from retracted to forward position, whereby the lever is cammed upon engagement with the abutment for swinging movement from operative to operated positions during linear movement of the lever from retracted to forward position.

14. In a machine for the assembly of an eye member having a body portion with prongs extending outwardly therefrom and a stay plate having openings through which the prongs of the eye member extend for attachment and in which the eye members are mounted in feeding relation in end-to-end relation with the prongs extending outwardly into space, means for displacing said eye members singly in feeding relation during each cycle of operation of the machine comprising an elongated lever arm, means mounting the lever arm for pivotal movement in a plane crosswise of the prongs between an operated and operative position, other means operatively engaging said pivotal lever-mounting means for linear displacement of the lever arm between a forward position in which the end of the lever arm extends into the path between the prong members and a retracted position in which the lever arm is behind the path of the prong members, means operatively engaging said lever arm responsive to displacement to retracted position for effecting swinging movement thereof from operated to operative position, means operatively engaging said lever arm during movement from retracted to forward position for rocking the lever arm from operative to operated position, whereby the lever arm lies in the path between the prongs of the eye members during movement from operative to operated position to effect endwise displacement of the eye member having prongs lying in the path thereof.

15. A machine as claimed in claim 14 in which the means for rocking the lever arm from operated to operative position responsive to displacement of the lever arm from forward to retracted position comprises a stationary abutment in the path to be engaged by the rearward end of the lever arm upon displacement to retracted position and in which the end of the lever arm and the wall of the abutment engaged are formed angularly with respect to one another when in the operated position, thereby to effect rocking movement of the lever arm from operated to operative position as the engaging portions are urged in the direction towards each other to bring the edges into alignment.

16. A machine as claimed in claim 14 in which the means operatively engaging the lever arm during movement from retracted to forward position for displacement of the lever arm from operative to operated position comprises a cam on the edge of the lever arm in the operative direction spaced rearwardly from the forward end thereof, an abutment in the path of the cam to effect rocking movement of the lever arm from operative to operated position responsive to forward displacement of the lever arm from retracted to forward position.

17. In a machine for the assembly of an eye member having a body portion with prongs extending outwardly therefrom and a stay plate having openings through which the prongs of the eye member extend for attachment, a frame, a magazine for the supply of a plurality of eye members, a second magazine for the supply of a plurality of stay plates, means for displacing said eye members singly in feeding relation from the magazine during each cycle of operation of the machine comprising an elongate lever mounted for swinging movement between operative and operated positions, means mounting said pivotally mounted lever arm for linear movement between forward and retracted positions, means responsive to movement of lever arm to retracted position for rocking the lever arm from operated to operative positions, and means operatively engaging the lever arm during movement from retracted to forward position for rocking the lever arm from operative to operated positions, means for displacing said stay plates singly in feeding relation from said separate magazine during each cycle of operation of the machine comprising an opening in the opposite walls of the magazine dimensioned to have a heighth greater than the thickness of one plate but less than the thickness of two, a pusher slide mounted for shifting movement lengthwise in the direction toward and away from said walls having said openings and in alignment therewith between a forward position in which a portion of said slide is displaced through the magazine through said aligned openings and a retracted position in which the slide is free of the stay plates in the magazine, means operatively engaging the slide for causing displacement thereof through a complete cycle between forward and retracted position during a cycle of operation of the machine, means for conveying an eye member displaced from the magazine into a vertically aligned relation with a stay plate with the prongs of the eye member aligned with the openings in the stay plate and extending from the eye member towards the stay plate and including means for effecting relative movements between the aligned stay plate and the eye member in the direction towards each other for passage of the prongs through the aligned openings in the stay plate, bending means operative subsequent to insertion of the prongs of the eye member through the openings of the stay plate for bending the through-extending portions of the prongs, a power source, and an operative connection between the power source and said stay plate and eye feed means, said eye-conveying means and said bending means for rendering said means effective in sequence during each cycle of operation of the machine.

18. In a machine for the assembly of an eye member having a body portion with prongs extending outwardly therefrom and a stay plate having openings through which the prongs of the eye member extend for attachment including a magazine for the supply of a plurality of stay plates and a base plate upon which the magazine rests, a means for displacing said stay plates singly in feeding relation from said magazine during each cycle of operation of the machine comprising openings in the side walls of the magazine contiguous with the base plate dimensioned to have a height greater than the thickness of a stay plate but less than two, a slide mounted for shifting movement lengthwise in the base plate in the direction toward and away from the side walls of said openings and in alignment therewith and having an end portion projecting upwardly beyond the surface of the base plate by an amount corresponding to the opening in the magazine, thereby to displace the lowermost stay plate from the magazine upon movement of the slide therethrough and in which the forward end portion of the slide is mounted for reciprocal movement within a guide housing having an opening extending inwardly from the forward end dimensioned in cross-section to correspond with the slide and having a length greater than the length of the slide retained within the housing, an opening extending crosswise in the rearward portion of the slide, an elongate slot in the side wall of the housing adjacent the opening and in alignment therewith, an arm mounted for swinging movement between forward and retracted positions of adjustment and having an end portion extending laterally through the slot and into engagement with the slide, and means for actuating said arm for swinging movement between forward and retracted positions of adjustment during each cycle of operation of the machine.

19. In a machine for the assembly of an eye member having a body portion with prongs extending outwardly therefrom and a stay plate having openings through which the prongs of the eye member extend for attachment with a textile material therebetween, a frame, a magazine for supply of a plurality of eye members, a separate magazine for the supply of a plurality of stay plates, means for displacing eye members singly in feeding relation from the magazine during each cycle of operation of the machine, means for displacing one of said stay plates singly in feeding relation from said separate magazine during each cycle of operation of the machine; ram means for conveying an eye member displaced from the magazine into alignment with a displaced stay plate and with the prongs of the eye member aligned with the openings in the stay plate and for effecting relative movement between the aligned stay plate and eye member in the direction towards each other for passage of the prongs through the aligned openings of the stay plate, in which said conveying means comprises a vertically disposed elongate ram shiftable vertically during a cycle of operation of the machine between raised and lowered positions and mounted at its upper end for swinging movement in a vertical plane, and means responsive to movement of the ram to raised position for swinging the ram rearwardly into endwise alignment with the eye member displaced in feeding relation from the magazine to receive the eye member for use, and means responsive to movement of the ram toward lowered position for swinging the ram forwardly to bring the eye member into alignment with the stay plate, bending means operative subsequent to insertion of the prongs of the eye member through the openings of the stay plate for bending the through-extending portions of the prongs, a power source, and an operative connection between the power source and said stay plate and eye feed means, said eye-conveying means and said bending means for rendering said means effective in sequence during each cycle of operation of the machine.

20. A machine as claimed in claim 19 in which the magazine for the supply of eye members comprises a vertically disposed elongate housing attached to the frame having side walls spaced one from the other by a distance corresponding to the width of the body portion of the eye members and having a front and back wall spaced one from the other by an amount slightly greater than the thickness of the body portions but less than the length of the prongs extending outwardly therefrom and having a slot extending continuously lengthwise through the central portion of the front wall dimensioned to have a width less than the width of the body portion of the eye members but greater than the width of the prong members extending outwardly therefrom so that the prongs extend outwardly through the slot in the front wall of the housing as the eye members shift in end-to-end relation through the housing and in which the means for displacing the eye members in feeding relation singly from the magazine during each cycle of operation comprises an elongate lever arm, means mounting the lever arm for pivotal movement in a plane crosswise of the prongs between an operated and an operative position, means for effecting linear displacement of the pivotally mounted lever arm between a forward position with the end of the lever arm extending through the path of the prong members and a retracted position in which the lever arm is beyond the path of the prong members, means responsive to displacement of the lever arm to retracted position for causing the swinging movement thereof from operated to operative position, and means responsive to linear movement of the lever arm from retracted to forward position for rocking the lever arm from operative to operated position thereby to effect displacement of the eye members in feeding relation.

21. A machine as claimed in claim 19 in which the means for effecting rocking movement of the ram between forward and rearward position comprises a lever, a pivotal connection between the rear end of the lever and the frame and a pivotal connection between the other end of the lever and an intermediate portion of the ram.

22. A machine is claimed in claim 19 which includes guide means and an operative connection between said guide means and the ram for guiding the ram in swinging movement between a forward and rearward position.

23. A machine as claimed in claim 22 in which the guide means comprises a rigid plate fixed to the frame and in which said operative connection between said ram and the guide means comprises a slot extending upwardly and rearwardly from the front edge of said guide plate and a pin extending laterally from an intermediate portion of the ram in position to be received in said slot during movement of the ram between lowered and raised position, and in which the pin is dimensioned to be received in fitting relation in the slot thereby to rock the ram about its pivot.

24. In a machine for the assembly of an eye member having a body portion with the prongs extending outwardly therefrom and stay plates having openings through which the prongs of the eye member extend for attachment and in which the stay plates and eye members are separately fed into position in alignment with each other for attachment, a means for conveying the eye member into a vertically aligned relation with the stay plate with the prongs of the eye member aligned with the openings in the stay plate and extending from the eye member towards the stay plate and for effecting relative movements between the aligned stay plates and the eye member in the direction towards each other for extending the prongs through the aligned openings of the stay plates, in which said conveying means comprises a vertically disposed elongate ram mounted for shifting movement vertically during a cycle of operation of the machine between raised and lowered positions and mounted at its upper end for swinging movement in a vertical plane, means responsive to movement of the ram from lowered to raised position for displacing the ram rearwardly into endwise alignment with the eye member displaced in feeding relation from its supply source to receive the eye member and responsive to movement of the ram from raised toward lowered position for displacing the ram forwardly about its pivot to bring the eye member into vertical alignment with the stay plate.

25. A machine as claimed in claim 24 in which the means for effecting rocking movement of the ram between forward and rearward positions of adjustment comprises a lever pivoted at one end onto a stationary support and pivoted at the other end onto an intermediate portion of the ram, said lever being angularly disposed at a relatively sharp angle when the ram is in its rearward position.

26. A machine as claimed in claim 24 which includes a guide means and an operative connection between said guide means and the ram for guiding the ram in swinging movement between forward and rearward positions.

27. A machine as claimed in claim 26 in which the guide means comprises a rigid plate stationarily mounted in the machine and in which the operative connection between the ram and said plate comprises a slot in the plate extending upwardly and rearwardly from the forward edge thereof, and a pin extending laterally from an intermediate portion of the ram in position to be received in fitting relation in the slot.

28. In a machine for the assembly of an eye member having a body portion with prongs extending outwardly substantially perpendicularly therefrom and a stay plate having openings through which the prongs of the eye member extend for attachment with a textile material between the stay plate and the eye member, a magazine for the supply of a plurality of stay plates, a separate magazine for the supply of a plurality of eye members, means for displacing one of said eye members in feeding relation from the magazine during each cycle of operation of the machine, means for displacing one of said stay plates in feeding relation from said separate magazine during each cycle of operation of the machine, means for conveying an eye member displaced from the magazine into a vertically aligned relation with a stay plate with the prongs of the eye member aligned with the openings in the stay plate and extending from the eye member towards the stay plate and including means for effecting relative movements between the aligned stay plate and the eye member in the direction towards each other for passage of the prongs through the aligned openings in the stay plate, bending means operative subsequent to insertion of the prongs of the eye member through the openings of the stay plate for bending the through-extending portions of the prongs, a power source, and an operative connection between the power source and said stay plate and eye feed means, said eye-conveying means and said bending means for rendering said means effective in sequence during each cycle of operation of the machine, said machine including a base plate on which the magazine for the stay plates rests and in which the side walls of the magazine are spaced at their lower ends from the base plate by an amount greater than the thickness of one stay plate but less than the thickness of two and in which the means for displacing one of the stay plates in feeding relation from the magazine during a cycle of operation of the machine comprising a slide shiftable endwise of the base plate with a leading end portion projecting upwardly beyond the surface thereof by an amount corresponding to the space between the lower edge of the side walls of the magazine and the base plate thereby to displace the lowermost stay plate in the stack in the magazine upon movement of the slide endwise through the magazine, and in which the slide is mounted within the housing having an opening extending inwardly from the forward end corresponding in cross-section to the cross-section of the slide and having a length greater than the length of the slide retained within the housing when in retracted position, an elongate slot in the side wall of the housing adjacent to the opening and in alignment therewith, an arm extending laterally through the slot into the opening for operative engagement with the slide, and means for rocking said arm in a plane parallel with the slide for displacement of the slide endwise between forward and retracted positions during a cycle of operation of the machine.

References Cited in the file of this patent

UNITED STATES PATENTS

| | | |
|---|---|---|
| 665,092 | Henius et al. | Jan. 1, 1901 |
| 1,112,704 | Keller | Oct. 6, 1914 |
| 1,203,554 | Brockett | Oct. 31, 1916 |
| 1,859,101 | Lyons | May 17, 1932 |
| 2,208,759 | Gualtiere | July 23, 1940 |
| 2,718,004 | Steinmetz | Sept. 20, 1955 |